United States Patent
Hillman et al.

(10) Patent No.: US 7,028,679 B2
(45) Date of Patent: Apr. 18, 2006

(54) ENGINE AIR CHARGE SYSTEM WITH BRANCH CONDUITS

(75) Inventors: Paul D. Hillman, Sutton-in-Ashfield (GB); Stephen P. Middleton, Hale (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/688,117

(22) Filed: Oct. 17, 2003

(65) Prior Publication Data

US 2004/0079346 A1 Apr. 29, 2004

(30) Foreign Application Priority Data

Oct. 17, 2002 (GB) .................................... 0224130

(51) Int. Cl.
*F02B 33/00* (2006.01)
*F02M 35/10* (2006.01)

(52) U.S. Cl. ............ 123/563; 123/184.31; 123/184.53; 123/184.58; 123/184.59

(58) Field of Classification Search ............... 123/563, 123/564, 184.31, 184.24, 184.42, 184.58, 123/184.59, 184.61, 184.53, 559.1; 60/612; 180/190

See application file for complete search history.

(56) References Cited

U.S. PATENT DOCUMENTS

| | | | | | |
|---|---|---|---|---|---|
| 4,563,132 | A | * | 1/1986 | Grimmer | 60/612 |
| 5,031,598 | A | * | 7/1991 | Ueda et al. | 123/564 |
| 5,497,751 | A | * | 3/1996 | Ohtake | 123/479 |
| 5,785,027 | A | * | 7/1998 | Chabry | 123/184.24 |
| 5,845,495 | A | * | 12/1998 | Schray et al. | 60/612 |
| 2004/0031636 | A1 | * | 2/2004 | Pichler et al. | 180/190 |

FOREIGN PATENT DOCUMENTS

JP 61028719 A * 2/1986
JP 01110835 A * 4/1989

* cited by examiner

*Primary Examiner*—Thai-Ba Trieu

(57) ABSTRACT

Prior art air charge systems for 'V' configuration internal combustion engines use two turbochargers and two intercoolers, one for each bank of cylinders, and require relatively long and complex air ducts. The present invention provides a charge air system for a 'V' engine with two banks of cylinders. The system includes a compressor connected by a charge air conduit to a charge air cooler and a flow control valve in communication with first and second branch conduits, each adapted for connection to a bank of cylinders. A branch connector has one inlet in communication with the valve and two outlets in communication with the two branch conduits. The charge air conduit may be disposed in the 'V' between the two banks of cylinders. The system uses one compressor and one cooler, thereby reducing component and assembly costs for the engine and keeping air ducting relatively simple.

14 Claims, 3 Drawing Sheets

ENGINE AIR CHARGE SYSTEM WITH BRANCH CONDUITS

TECHNICAL FIELD

This invention relates to a air charge system for a 'V' configuration internal combustion engine in which two banks of cylinders are arranged to be inclined to each other, and is particularly but not exclusively applicable to an air charge system in which the boost air from the compressor of a turbocharger is cooled by an intercooler before being directed to the air inlet ports of the internal combustion engine.

BACKGROUND

It is known to use turbochargers and other air charge means to increase the performance of internal combustion engines by delivering air at a higher pressure to the cylinders of the engine. It is also known to use an air-to-air aftercooler (also known as an intercooler) in combination with a turbocharger. When the turbocharger compresses air, the air naturally heats up, and this reduces its density. The aftercooler cools the air to increase the density and thereby increase the mass of air delivered to the cylinders. However when a turbocharger and intercooler are used in a 'V' configuration engine, it is necessary to provide two turbochargers and two intercoolers, one for each bank of cylinders. Moreover the air ducts which deliver the charged air to the inlet manifolds can be relatively long and complex in shape.

The present invention provides a charge air system for a 'V' configuration internal combustion engine that overcomes one or more of these problems.

SUMMARY OF THE INVENTION

The present invention provides a charge air system for delivering charged air from a compressor to a 'V' configuration internal combustion engine having first and second spaced banks of cylinders each defining a plurality of combustion chambers. The charge air system comprises a compressor outlet and a charge air cooler having an inlet and an outlet, the inlet being in communication with the compressor outlet. The system also comprises a first branch conduit adapted for communication with the first bank of cylinders, a second branch conduit adapted for communication with the second bank of cylinders, and a flow control valve in communication with the outlet of the charge air cooler and with the first and second branch conduits.

The present invention also provides a method of delivering charged air from a compressor to a 'V' configuration internal combustion engine having first and second spaced banks of cylinders each defining a plurality of combustion chambers, comprising:

causing charge air to flow from a compressor outlet along a conduit disposed in the 'V' between the first and second spaced banks of cylinders to a charge air cooler;

cooling the charge air at the charge air cooler;

causing cooled charge air to flow from the charge air cooler to a flow control valve; and controlling the flow of cooled charge air to a first branch conduit connected to the first bank of cylinders and a second branch conduit connected to the second bank of cylinders by adjusting the flow control valve.

Other features and aspects of this invention will be apparent from the following description and the accompanying drawings.

DETAILED DESCRIPTION

Figure 1:
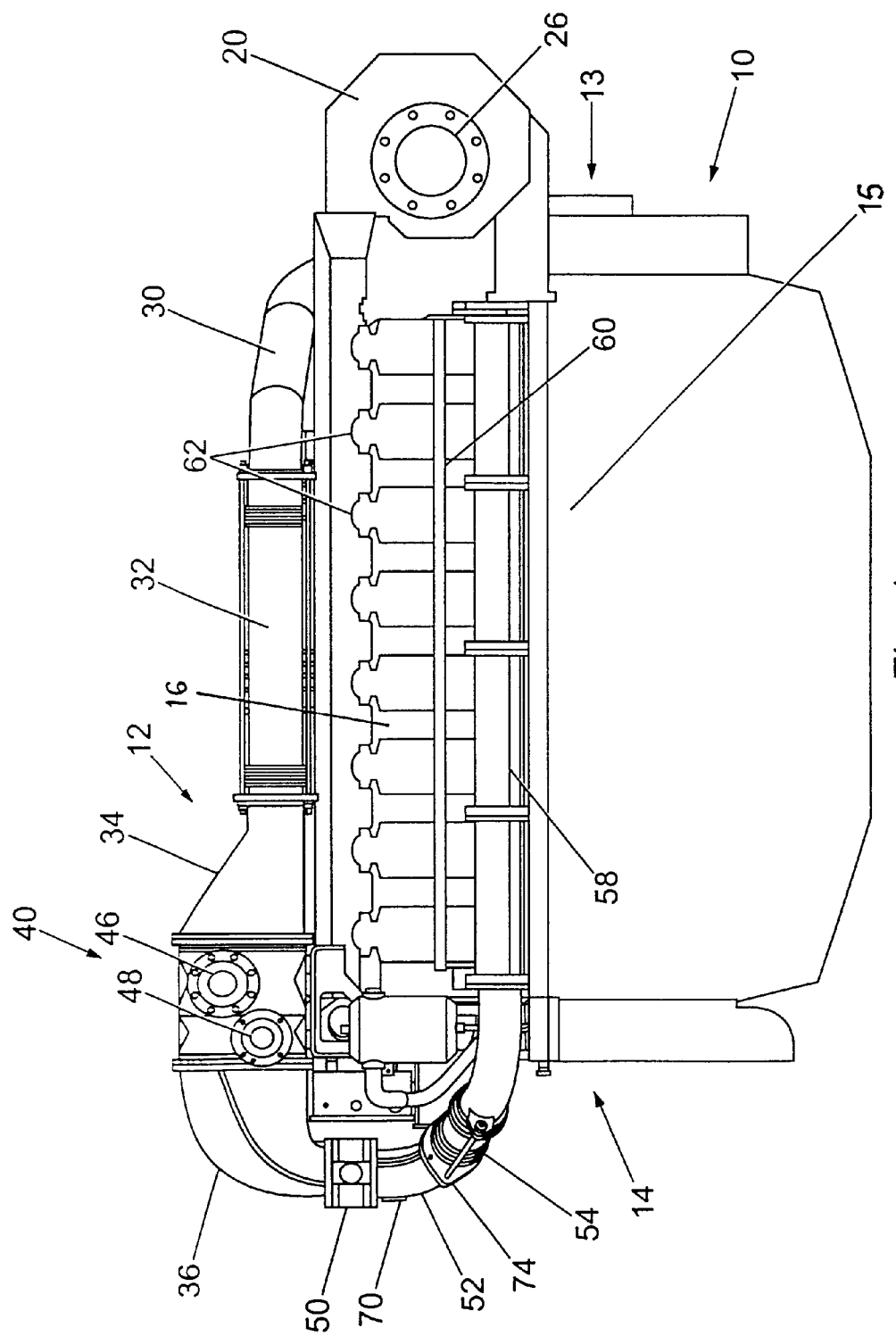
FIG. 1 is a side elevation of a charge air system according to a first embodiment of the present invention mounted on a 'V' configuration internal combustion engine.
Figure 3:
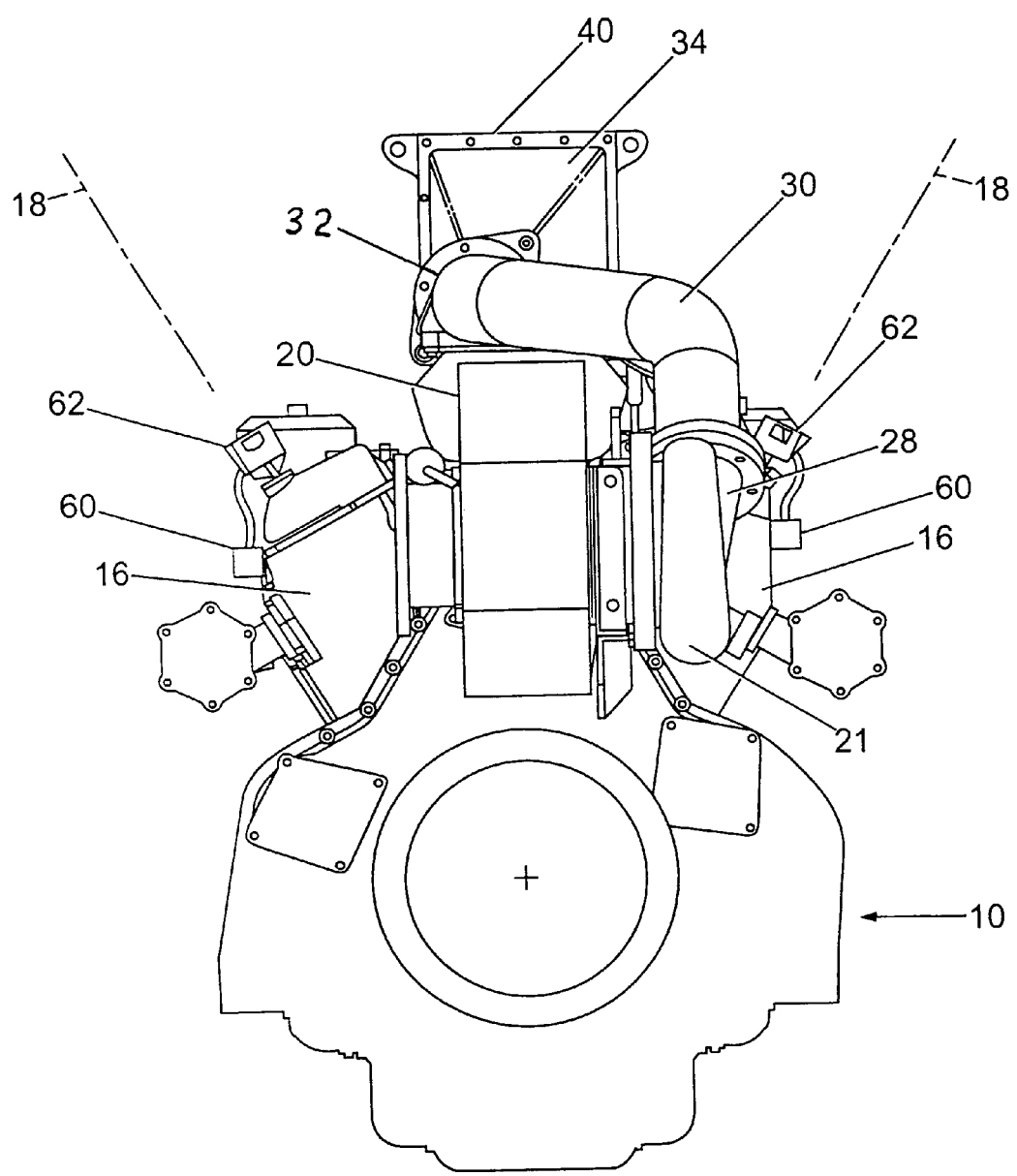
FIG. 3 is an end elevation of the charge air system and 'V' configuration internal combustion engine of FIG. 1.

Referring to the drawings, one embodiment of the present invention is now described, by way of example only. FIG. 1 shows a 'V' configuration sixteen cylinder internal combustion engine 10. The cylinders are arranged in the cylinder block 15 of the engine in two spaced banks 16 of eight cylinders, of which one bank 16 is visible in FIG. 1. The two banks 16 of cylinders are inclined and define a 'V' space between the banks. The 'V' space is seen most clearly in FIG. 3 and is bounded by planes 18 in which lie the center lines of the cylinders in each bank 16. Although the illustrated embodiment shows an engine having sixteen cylinders, it will be understood that other cylinder configurations are possible, for example eight or twelve cylinders. Although the illustrated embodiment shows a compression ignition engine, it will be understood that the invention could also be applied to a spark ignition engine.

Each bank of cylinders has an associated engine ignition wiring rail 60, while each cylinder has an associated engine ignition transformer 62. Each bank 16 of cylinders also has an associated branch conduit 54, 56. Each branch conduit 54, 56 has a straight portion 58 delivering cooled charge air to the cylinders of the associated bank 16.

Figure 2:
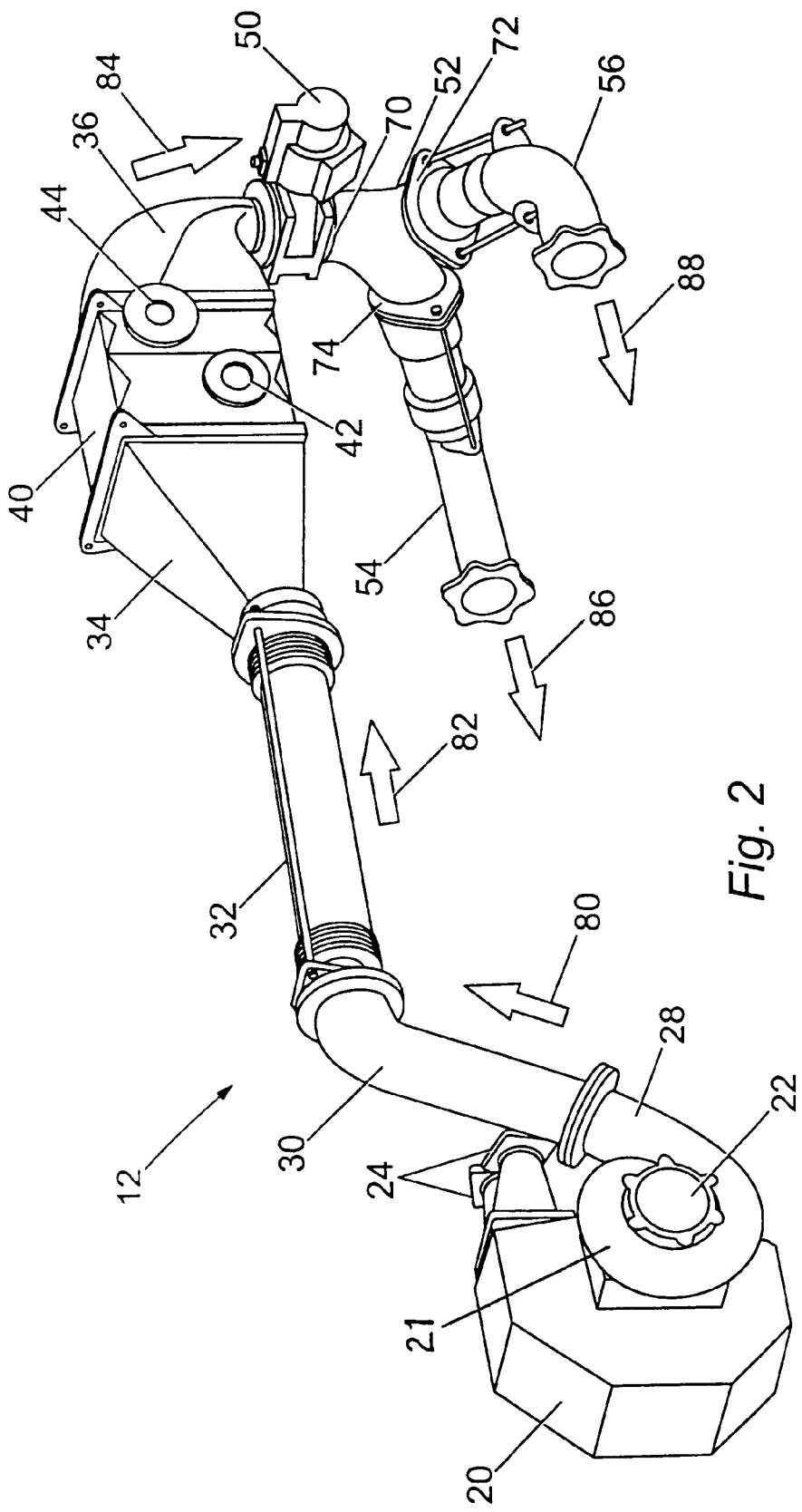
FIG. 2 is a perspective view of the charge air system of FIG. 1.

Referring to FIGS. 1 and 2 the components of the charge air system 12 are described. FIG. 2 shows the charge air system 12 of FIG. 1 with the engine removed for clarity. The engine 10 has a single conventional turbocharger 20 located at a first end 13 of the engine 10. The turbocharger 20 has a compressor 21 with a gas/air inlet 22 and exhaust gas inlets 24. The exhaust gas outlet 26 is connected to the engine exhaust system, while the compressor outlet 28 delivers compressed charge air to a compressor outlet duct 30. The invention is not limited to compressors driven by a turbocharger, and other means may be used to drive the compressor 21, such as a supercharger.

Charge air flows from the duct 30 to a substantially straight charge air conduit 32 disposed in the 'V' between the two banks of cylinders. The 'V' is considered to extend above the tops of the cylinders in the two banks, and it is understood that the charge air conduit 32 may be higher or lower with respect to the cylinders than the position shown in FIG. 1. The 'V' typically has an internal angle of 60°, but the angle can be greater or smaller than 60°. In a particular embodiment of the invention the 'V' may have an internal angle of 180° so that the banks of cylinders lie flat in an opposed configuration.

Charge air flows along the charge air conduit 32 in the direction of the arrow 80 shown in FIG. 2 to a charge air cooler 40 having an inlet 34 and an outlet 36. The charge air cooler 40 is conventional and has a jacket water inlet 42, a raw water inlet 44, a jacket water outlet 46 and a secondary water outlet 48. In the illustrated embodiment the charge air cooler 40 is disposed at a second end 14 of the engine in the 'V' between the two banks of cylinders, although it may be positioned lower at the end of the cylinder block 15 in a similar position to that occupied by the turbocharger compressor 20, to fit with other engine components or other apparatus with which the engine 10 is to be used. Similarly, the position of the turbocharger compressor 20 may be varied to suit circumstances.

Cooled charge air flows from the outlet 36 of the charge air cooler 40 in the direction of the arrow 84 shown in FIG. 2 to a flow control valve 50. The flow control valve 50 may be a throttle valve 50 controlled electrically or mechanically by a control system (not shown) to control by restriction the flow of cooled charge air to the cylinders. In the preferred embodiment the valve 50 is a butterfly valve. Beneath the valve 50 is a 'Y' branch connector 52 having one inlet 70 and two outlets 72, 74. Connected to each outlet 72, 74 is a branch conduit 54, 56. The first branch conduit 54 takes cooled charge air to the first bank of cylinders, while the second branch conduit 56 takes cooled charge air to the second bank of cylinders. Each branch conduit 54, 56 includes a substantially straight portion 58 disposed on the opposite side of the respective bank of cylinders 16 to the central charge air conduit 32.

INDUSTRIAL APPLICABILITY

The charge air system 12 of the present invention provides cooled charge air to a 'V' configuration engine 10 while requiring only one compressor 21 and one charge air cooler 40. Air is compressed and heated by the compressor 21 and then is driven along a single charge air conduit 32 disposed in the 'V' between the spaced banks of cylinders, in the direction of the arrow 82 shown in FIG. 2. The charge air cooler 40 cools the charge air for both banks of cylinders before the flow of charge air is split into two by the 'Y' branch connector 52. A single flow control valve 50 is used to control the flow of cooled charge air to both banks of cylinders. The cooled charge air is then driven through the two branch conduits 54, 56 and along the straight portions 58 of the branch conduits, in the direction of the arrows 86, 88 shown in FIG. 2. The direction 86, 88 of air flow in the two branch conduits 58 is thus opposite to the direction 82 of air flow in the single charge air conduit 32.

Because the charge air conduit 32 is disposed in the 'V' between the two banks of cylinders, the space of the engine 10 is used efficiently. It is not necessary to provide a compressor and cooler together with complex ducting on each side of the engine. Instead the single compressor 21 and single cooler 40 can be fitted wherever is appropriate, for example at opposed ends 13, 14 of the engine 10. The charge air supply is divided at the 'Y' connector 52, so that the only part of the charge air system which is required on the external face of each bank of cylinders is the straight portion 58 of each branch conduit 54, 56, resulting in uncluttered external faces of the engine 10.

It is to be understood that the geometric arrangement of the components of the charge air system may be varied to suit the layout of the engine with which the charge air system is to be used.

The present invention provides a charge air system that eliminates the air ducting complexity associated with prior art charge air systems. By keeping the air paths relatively straight line losses are kept to a minimum and the air flow pressure is optimized. The system may use only one compressor and one charge air cooler, serving both banks of cylinders, thereby reducing component and assembly costs for the engine, although it is to be understood that if required the system may use two or more compressors and/or two or more charge air coolers.

Although the preferred embodiments of this invention have been described herein, improvements and modifications may be incorporated without departing from the scope of the following claims.

What is claimed is:

1. A method of delivering charged air from a turbocharger compressor to a 'V' configuration internal combustion engine having first and second spaced banks of cylinders each defining a plurality of combustion chambers, comprising:

causing charge air to flow from a compressor outlet in a first direction along a conduit disposed in the 'V' between said first and second spaced banks of cylinders to a charge air cooler;

cooling said charge air at said charge air cooler;

causing cooled charge air to flow from said charge air cooler to a flow control valve;

controlling the flow of cooled charge air to a first branch conduit connected to said first bank of cylinders and a second branch conduit connected to said second bank of cylinders by adjusting said flow control valve; and wherein said first and second branch conduits deliver cooled charge air in a second direction substantially opposite said first direction.

2. The method of claim 1, in which cooled charge air flows from said flow control valve to an inlet of a connector, said connector having two outlets, cooled charge air flowing from each of said outlets to said first and second branch conduits respectively.

3. The method of claim 2, wherein the engine has first and second opposite ends, and the compressor is provided at the first end of the engine and the charge air cooler is provided at the second end of the engine.

4. The method of claim 1, wherein the engine has first and second opposite ends, and the compressor is provided at the first end of the engine and the charge air cooler is provided at the second end of the engine.

5. An internal combustion engine comprising:

first and second spaced banks of cylinders each defining a plurality of combustion chambers and a 'V' space therebetween;

a compressor having a compressor outlet;

a charge air cooler having an inlet and an outlet, said inlet being in communication with said compressor outlet;

a charge air conduit connecting said compressor outlet and said charge air cooler inlet, said charge air conduit including a substantially straight portion disposed in the 'V' between said first and second spaced banks of cylinders for delivering air in a first direction;

a first branch conduit in communication with said first bank of cylinders;

a second branch conduit in communication with said second bank of cylinders;

the first and second branch conduits delivering air in a second direction, substantially opposite the first direction, to the first and second banks of cylinders;

a flow control valve in communication with said outlet of said charge air cooler and in communication with said first and second branch conduits.

6. The internal combustion engine of claim 5, further including a connector having one inlet and two outlets, said connector inlet being in communication with said flow control valve and said two connector outlets being in communication with said first and second branch conduits respectively.

7. The internal combustion engine of claim 6, wherein said first and second branch conduits each include a substantially straight portion disposed on the opposite side of said first and second spaced banks of cylinders respectively to said substantially straight portion of said charge air conduit.

8. The internal combustion engine of claim 7, wherein the engine has first and second opposed ends, the compressor is provided at the first end of the engine and the charge air cooler is provided at the second end of the engine.

9. The internal combustion engine of claim 6, wherein the engine has first and second opposed ends, the compressor is provided at the first end of the engine and the charge air cooler is provided at the second end of the engine.

10. The internal combustion engine of claim 5, wherein said first and second branch conduits each include a substantially straight portion disposed on the opposite side of said first and second spaced banks of cylinders respectively to said substantially straight portion of said charge air conduit.

11. The internal combustion engine of claim 10, wherein the engine has first and second opposed ends, the compressor is provided at the first end of the engine and the charge air cooler is provided at the second end of the engine.

12. The internal combustion engine of claim 5, wherein the engine has first and second opposed ends, the compressor is provided at the first end of the engine and the charge air cooler is provided at the second end of the engine.

13. A charge air system for delivering charged air from a compressor to a 'V' configuration internal combustion engine having first and second spaced banks of cylinders each defining a plurality of combustion chambers, the system comprising:
 a compressor outlet;
 a charge air cooler having an inlet and an outlet, said inlet being in communication with said compressor outlet;
 a charge air conduit for connecting said compressor outlet and said charge air cooler inlet, said charge air conduit including a substantially straight portion for being disposed in the 'V' between said first and second spaced banks of cylinders for delivering air in a first direction;
 a first branch conduit for delivering air in a second direction, substantially opposite the first direction, to said first bank of cylinders;
 a second branch conduit for delivering air in the second direction, substantially opposite the first direction, to said second bank of cylinders;
 a branch connector delivering air from said charge air cooler to said first and second branch conduits; and
 a flow control valve in communication with said outlet of said charge air cooler and in communication with said first and second branch conduits and located between said outlet of said charge air cooler and said branch connector.

14. The charge air system of claim 13, wherein the branch connector has one inlet and two outlets, said branch connector inlet being in communication with said flow control valve and said two branch connector outlets being in communication with said first and second branch conduits respectively.

* * * * *